United States Patent
Muramoto

(10) Patent No.: US 7,285,345 B2
(45) Date of Patent: Oct. 23, 2007

(54) VENTILATION OF FUEL CELL POWER PLANT

(75) Inventor: Itsuro Muramoto, Yokohama (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 730 days.

(21) Appl. No.: 10/756,254

(22) Filed: Jan. 14, 2004

(65) Prior Publication Data

US 2004/0166381 A1   Aug. 26, 2004

(30) Foreign Application Priority Data

Feb. 20, 2003  (JP)  .............. 2003-042692

(51) Int. Cl.
*H01M 8/04*  (2006.01)
(52) U.S. Cl. .............. 429/23; 429/13; 429/22; 429/34
(58) Field of Classification Search .......... 429/12, 429/13, 22, 23, 34, 38, 24, 25
See application file for complete search history.

(56) References Cited

U.S. PATENT DOCUMENTS

2003/0008185 A1  1/2003  Sugino et al.

FOREIGN PATENT DOCUMENTS

| JP | 58-166670 | | 10/1983 |
| JP | 7-6777 | | 1/1995 |
| JP | 8-31436 | * | 2/1996 |
| JP | 8-167419 | | 6/1996 |
| JP | 8-236131 | | 9/1996 |
| JP | 10-116625 | | 5/1998 |
| JP | 11-111318 | | 4/1999 |
| JP | 2002-56864 A | | 2/2002 |
| WO | WO 01/59861 A2 | | 8/2001 |

* cited by examiner

*Primary Examiner*—Patrick Joseph Ryan
*Assistant Examiner*—Monique Wills
(74) *Attorney, Agent, or Firm*—McDermott Will & Emery LLP

(57) ABSTRACT

A fuel cell stack (2) of a fuel cell power plant (1) generates electric power using a fuel gas such as hydrogen supplied from a fuel gas supply device (3, 5, 5a), and an oxidant gas such as air supplied from an oxidant gas supply system (4). The fuel cell stack (2), fuel gas supply device (3, 5, 5a) and oxidant gas supply system (4) are housed in a casing (6). The casing (6) is provided with a ventilation fan (7). The concentration increase of the fuel gas in the casing (6) due to leaks is appropriately suppressed by the controller (10) controlling the operation of the fan (7) based on the power generation load of the fuel cell stack (2).

10 Claims, 17 Drawing Sheets

VENTILATION OF FUEL CELL POWER PLANT

FIELD OF THE INVENTION

This invention relates to ventilation of a casing which houses a fuel cell stack of a fuel cell power plant.

BACKGROUND OF THE INVENTION

In a fuel cell power plant, a fuel gas such as hydrogen, is supplied to an anode of a fuel cell stack, an oxidant gas such as oxygen is supplied to a cathode, the fuel gas and oxidant gas cause an electrochemical reaction via an electrolyte membrane between the anode and cathode, and electrical energy is extracted. When the fuel cell stack and peripheral devices are housed in a casing, fuel gas which leaked from the fuel cell stack or peripheral devices may accumulate inside the casing, but it is not preferred from a safety viewpoint that inflammable fuel gas accumulates in the casing.

Tokkai Hei 8-31436 published by the Japanese Patent Office in 1996 discloses a ventilator for sweeping out gas from the inside of the casing. The ventilator comprises an electric fan for ventilation installed in the casing, an open/close type door, a sensor for detecting an inflammable gas concentration in the casing and a controller.

When the concentration of inflammable gas increases, the controller increases the fan rotation speed to increase the ventilation air volume.

SUMMARY OF THE INVENTION

As the ventilator according to the prior art technique has a construction which responds to the concentration of inflammable gas in the casing, if the inflammable gas concentration in the casing rises rapidly, the ventilation air volume may be temporarily insufficient and the combustible gas concentration may exceed a permissible level. Thus, the ventilator must be increased in size in order to ensure that the ventilation air volume is sufficient.

Also, the prior art device detects the inflammable gas concentration by a sensor, but the inflammable gas concentration in the casing is not necessarily uniform, and the concentration distribution has a bias depending on the leak path of inflammable gas. Therefore, a discrepancy may arise between the inflammable gas concentration detected by the sensor, and the actual average concentration of inflammable gas in the casing, and this discrepancy becomes a factor which reduces the precision accuracy of the ventilation air volume.

It is therefore an object of this invention to increase the ventilation air volume of the casing prior to an increase in the concentration of inflammable gas in the casing.

It is another object of this invention to control the ventilation air volume without being affected by the concentration distribution of inflammable gas in the casing.

In order to achieve the above object, this invention provides a fuel cell power plant comprising a fuel cell stack comprising a laminate of fuel cells each of which comprises an anode a cathode and an electrolyte to generate power by an electrochemical reaction between a fuel gas supplied to the anode and an oxidant gas supplied to the cathode, via the electrolyte, a fuel gas supply device which supplies fuel gas to the anode, an oxidant gas supply device which supplies oxidant gas to the cathode, a casing which, among the fuel cell stack, the fuel gas supply device and the oxidant gas supply system, houses at least the fuel cell stack, a ventilator which ventilates the inside of the casing, and a controller programmed to control operation of the ventilator according to a power generation load of the fuel cell stack.

The details as well as other features and advantages of this invention are set forth in the remainder of the specification and are shown in the accompanying drawings.

DESCRIPTION OF THE PREFERRED EMBODIMENTS

Figure 1:
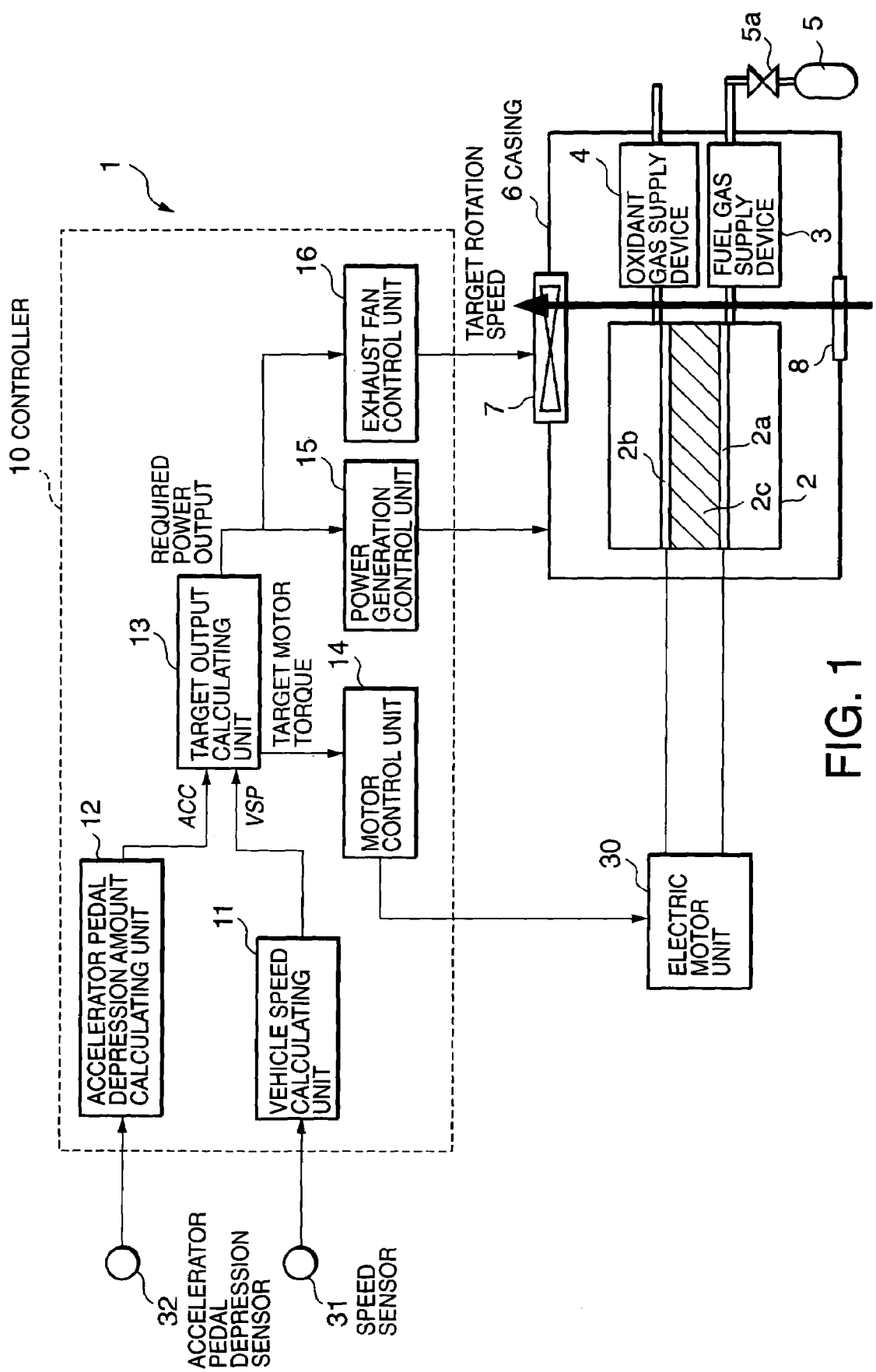
FIG. 1 is a schematic diagram of a fuel cell power plant for a vehicle according to this invention.

Referring to FIG. 1 of the drawings, a fuel cell power plant 1 for a vehicle is provided with a fuel cell stack 2 which generates electric power, a fuel gas supply device 3 which supplies fuel gas to the fuel cell stack 2, and an oxidant gas supply device 4 which supplies oxidant gas. Here, hydrogen is used as the fuel gas and air is used as the oxidant gas.

The fuel cell stack 2 is a laminate of fuel cells each of which comprises an anode 2a and cathode 2b on both sides of an electrolyte membrane 2c. The fuel cell stack 2 generates power according to an electrochemical reaction of the fuel gas supplied to the anode 2a and the oxidant gas supplied to the cathode 2b via the electrolyte membrane 2c.

Fuel gas is supplied to the fuel gas supply device 3 via a cutoff valve 5a from a fuel tank 5 in which fuel gas is stored. After the fuel gas supply device 3 decompresses the fuel gas to a set pressure, it is supplied to the anode 2a of the fuel cell stack 2.

The oxidant gas supply device 4 supplies oxidant gas, after performing flow rate adjustment, to the cathode 2b of the fuel cell stack 2.

A programmable controller 10 controls the supply flow rates of fuel gas and oxidant gas according to the power generation output required of the fuel cell stack 2.

The fuel cell stack 2, fuel gas supply device 3 and oxidant gas supply device 4 are disposed in a casing 6.

Fuel gas which has leaked from the fuel cell stack 2, fuel gas supply device 3, oxidizing agent supply device 4 or the interconnecting piping mixes with the air in the casing 6, and accumulates in the casing 6.

The casing 6 is provided with an exhaust fan 7 which discharges the gas in the casing 6 to the outside, and a fresh air inlet 8 which introduces fresh air into the casing 6 so that the concentration of fuel gas in the interior atmosphere does not increase. The gas containing fuel gas in the casing 6 is discharged outside by rotating the ventilation fan 7. Simultaneously, fresh air flows into the casing 6 from the fresh air inlet 8, and the fuel gas concentration in the casing 6 is reduced.

Fuel gas, i.e., hydrogen, is contained in the gas discharged from the exhaust fan 7. Therefore, it is also preferred to lead the gas discharged from the exhaust fan 7 to a combustor without discharging it directly into the atmosphere.

It is possible to provide a gas outlet instead of forming the exhaust fan 7 in the casing 6, and to provide an air intake fan in the fresh air inlet 8.

It is also possible to dispose one or both of the fuel gas supply device 3 and oxidant gas supply device 4 outside the casing 6.

The electric power generated by the fuel cell power plant 1 is supplied to an electric motor unit 30 for driving the vehicle. The electric motor unit 30 comprises an alternating current (AC) motor and an inverter, and converts the direct current supplied by the fuel cell power plant 1 into a predetermined alternating current to drive the AC motor. The operation of the AC motor is controlled according to a signal transmitted to the inverter from a controller 10. The rotation of the AC motor is transmitted to the vehicle drive wheels, and is used as power for running the vehicle.

The controller 10, which performs control of the power generated by the fuel cell power plant 1, the drive force of the electric motor unit 30 via the inverter and the operation of the exhaust fan 7 of the casing 6, comprises a microcomputer provided with a central processing unit (CPU), read-only memory (ROM), random-access memory (RAM) and input/output interface (I/O interface). The controller may also comprise plural microcomputers.

As parameters for the aforesaid control, detection value signals are input to the controller 10 from a speed sensor 31 which detects a vehicle running speed, and an accelerator pedal depression sensor 32 which detects a depression amount of an accelerator pedal with which the vehicle is provided, respectively.

The control function of the controller 10 will now be described.

The controller 10 comprises a vehicle speed calculating unit 11 which calculates the vehicle speed based on the input signal from the speed sensor 31, an accelerator pedal depression amount calculating unit 12 which calculates the accelerator pedal depression amount based on the input signal from the accelerator pedal depression sensor 32, a target output calculating unit 13, a motor control unit 14, a power generation control unit 15 and an exhaust fan control unit 16.

Figure 2:
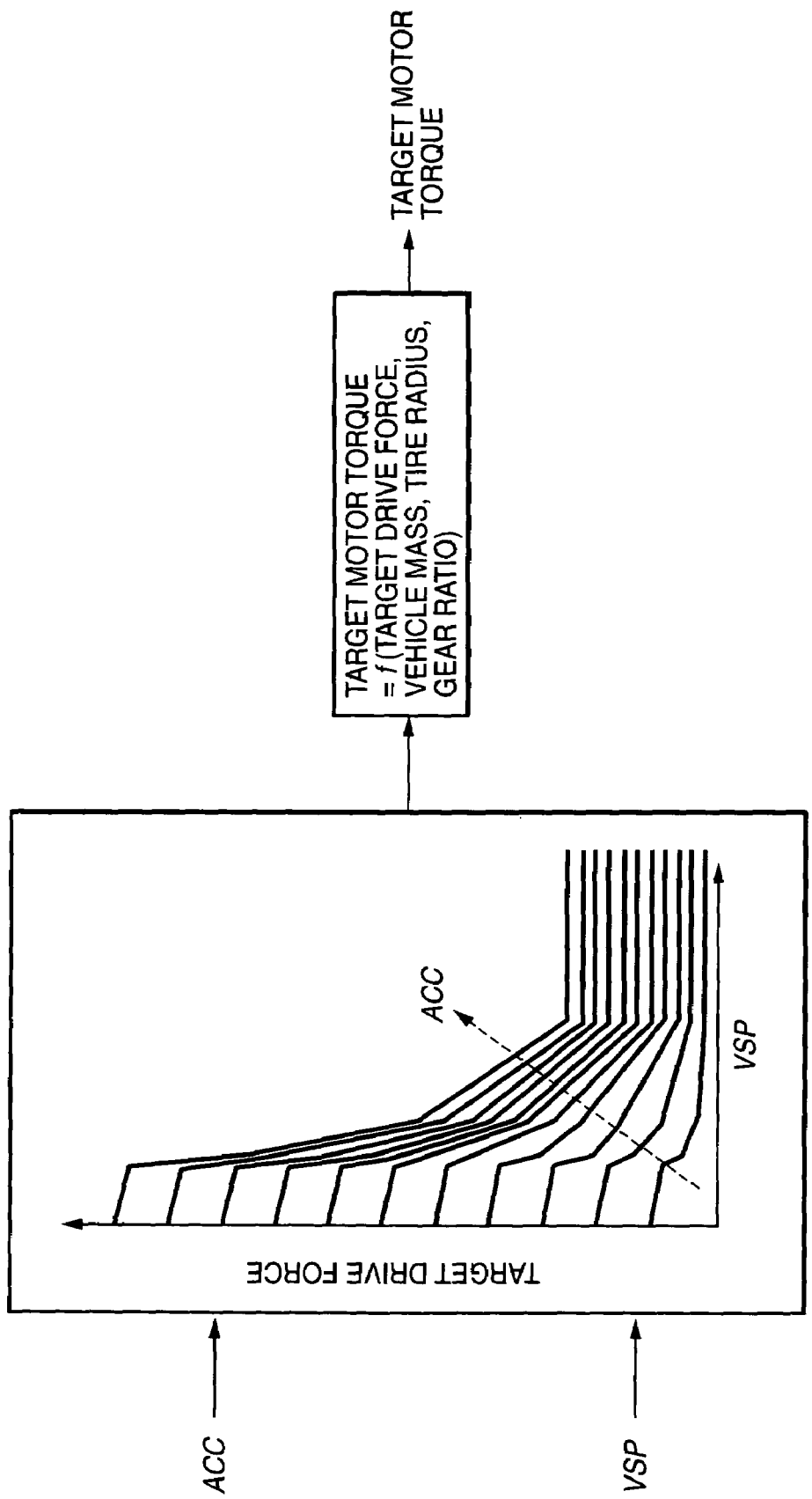
FIG. 2 is a block diagram describing a function of a target output calculating unit according to this invention.

Referring to FIG. 2, the target motor output unit 13 calculates a target drive force by looking up a two-dimensional map having the characteristics shown in the figure from a vehicle speed VSP calculated by the vehicle speed calculating unit 11 and an accelerator pedal depression amount ACC calculated by the accelerator pedal depression amount calculating unit 12. This map is prestored in the memory (ROM) of the controller 10.

The target output calculating unit 13 further calculates a target motor torque from the target drive force, the vehicle mass, the tire radius and the gear reduction ratio. As the vehicle mass, tire radius and gear reduction ratio are all known values determined by the vehicle specification, if the target drive force is determined, the target motor torque can be uniquely computed.

The motor control unit 14 controls the inverter of the electric motor unit 30 so that the output torque of the AC motor of the electric motor unit 30 coincides with the target motor torque.

The target output calculating unit 13 also calculates the required power output of the fuel cell stack 2 by adding the power losses of the electric motor unit 30, and the power requirements of accessory circuits including auxiliary instruments in the fuel cell power plant 1, to the power corresponding to the target motor torque. Herein, the required power output is equivalent to the load of the fuel cell stack 2.

The power generation control unit 15 controls the fuel gas supply amount of the fuel gas supply device 3 and the oxidant gas supply amount of the oxidant gas supply device 4 based on the required power output.

The exhaust fan control unit 16 calculates a target rotation speed of the exhaust fan 7 based on the required power output, and controls operation of the exhaust fan 7 based on the target rotation speed.

Next, the function of the exhaust fan control unit 16 will be described in detail referring to FIG. 3.

The exhaust fan control unit 16 comprises a fuel gas leak flow rate estimating section 161, a required ventilation flow rate calculating section 162 and an exhaust fan target rotation speed calculating section 163.

Figure 4:
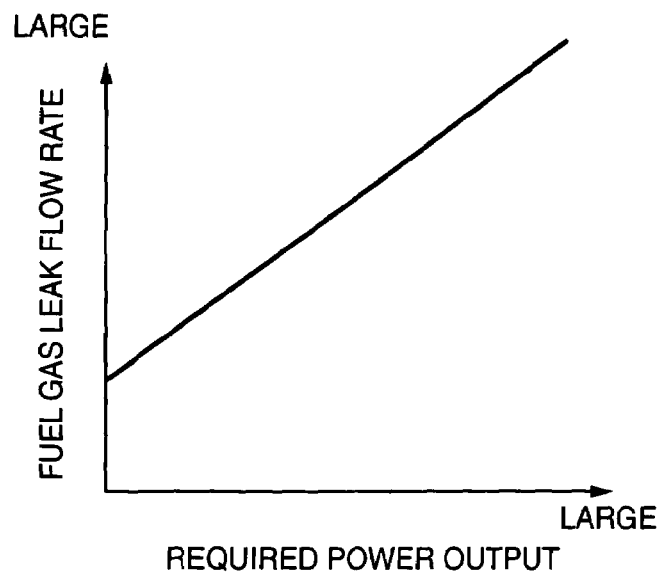
FIG. 4 is a diagram describing the characteristics of a map of fuel gas leak flow rate stored by the controller.

The fuel gas leak flow rate estimating section 161 estimates a fuel gas leak flow rate from the required power output of the fuel cell stack 2 by looking up a map having the characteristics shown in FIG. 4. This map is prestored in the memory (ROM) of the controller 10.

In this fuel cell power plant 1, it is assumed that fuel gas supplied to the fuel cell stack 2 is completely consumed by power generation, but if there is any gas which was not used for power generation, this is processed by an anode effluent combustion device which is separately provided. According to this assumption, it is possible that the fuel gas which accumulates in the casing 6 is limited to fuel gas which has leaked from the fuel cell stack 2, the fuel gas supply device 3, the oxidant gas supply device 4 or the interconnecting piping, and that its leak flow rate increases as the required power output increases, as shown in FIG. 4.

Figure 5:
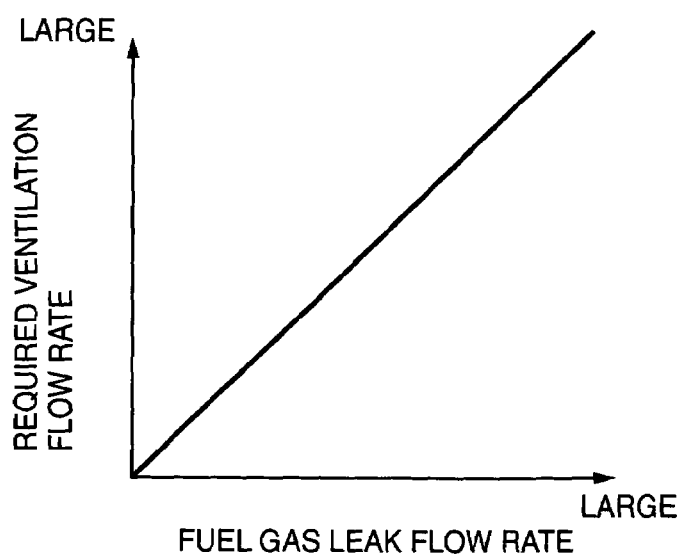
FIG. 5 is a diagram describing the characteristics of a map of required ventilation flow rate stored by the controller.

The required ventilation flow rate calculating section 162 calculates a target exhaust gas flow rate of the exhaust fan 7 from the fuel gas leak flow rate found by the fuel gas leak flow rate estimating section 161, by looking up a map having the characteristics shown in FIG. 5. This map is a map which specifies the target exhaust gas flow rate of the exhaust fan 7 required to control the fuel gas concentration in the casing 6 to below a predetermined reference concentration relative to the fuel gas flow rate. This map is preset by experiment or simulation, and is stored in the memory (ROM) of the controller 10. According to this map, the target exhaust gas flow rate of the exhaust fan 7 also increases as the fuel gas leak flow rate increases, as shown in FIG. 5.

Figure 6:
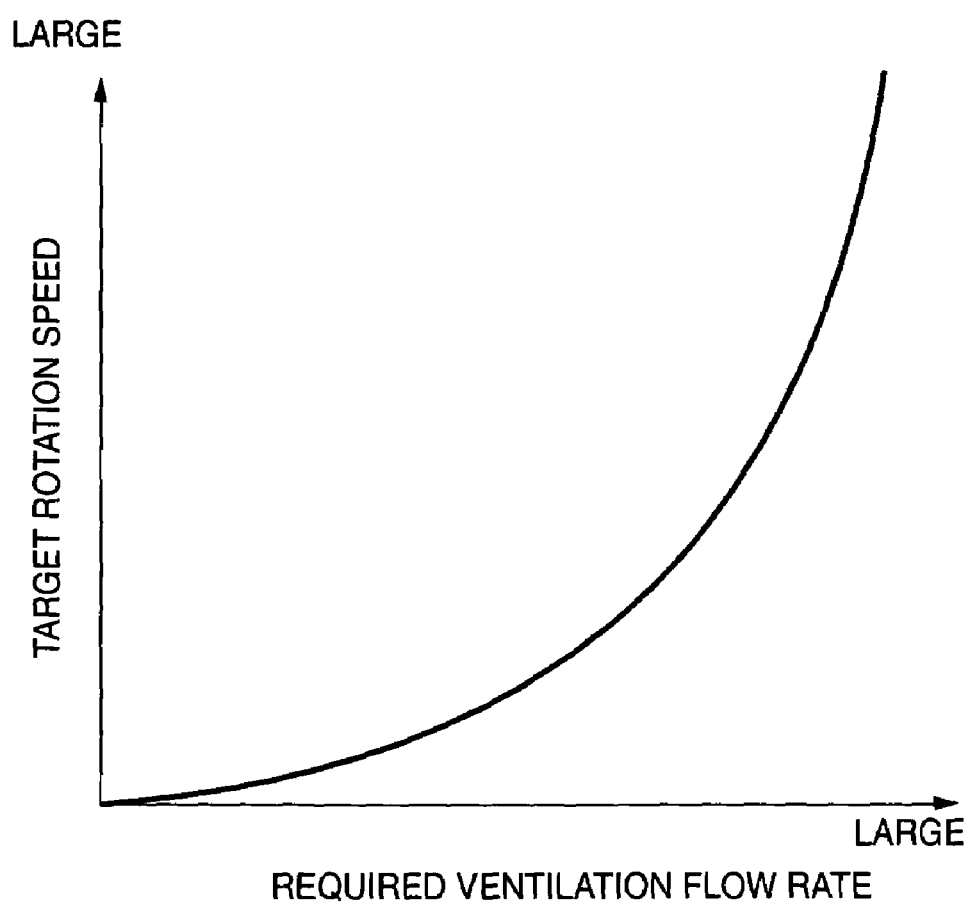
FIG. 6 is a diagram describing the characteristics of a map of ventilation fan rotation speed stored by the controller.

The exhaust fan target rotation speed calculating section 163 calculates the target rotation speed of the exhaust fan 7 from the target exhaust flow rate of the exhaust fan 7 by looking up a map having the characteristics shown in FIG. 6. This map is determined according to the specifications of the exhaust fan 7, and is prestored in the memory (ROM) of the controller 10.

The exhaust fan control unit 16 controls the exhaust gas flow rate of the exhaust fan 7 to the target exhaust flow rate by outputting a command signal corresponding to the target rotation speed calculated in this way to the exhaust fan 7.

Figure 3:
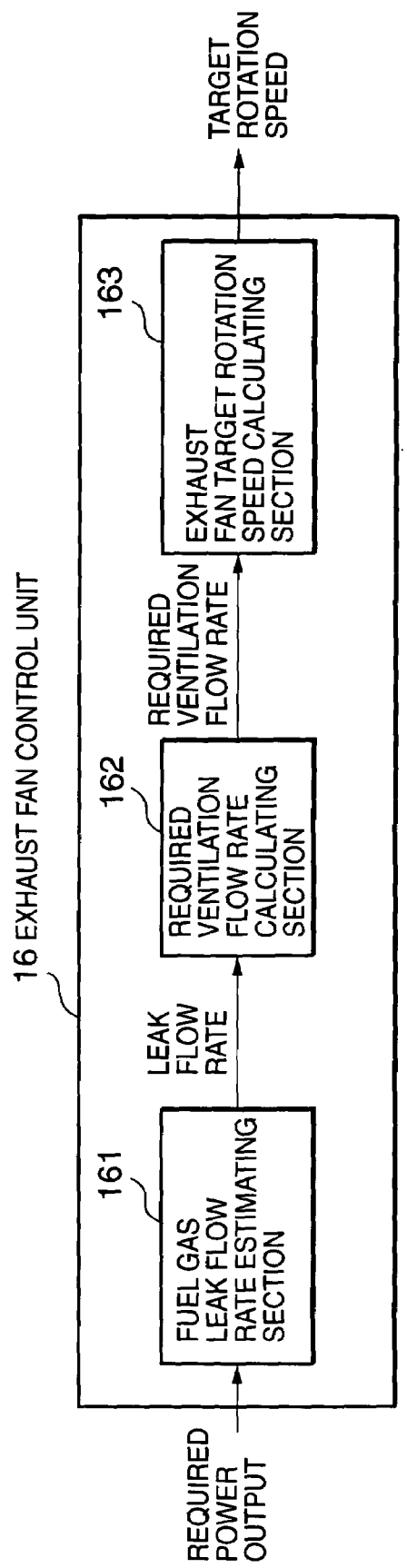
FIG. 3 is a block diagram describing a ventilation fan control function of the controller.

For simplicity, the units of the controller 10 shown in FIG. 1 and the sections shown in FIG. 3 all graphically represent functions of the controller as virtual units or sections, but do not exist physically.

As mentioned above, by controlling the exhaust gas flow rate of the exhaust fan 7 according to the required power output of the fuel cell power plant 1, the ventilation air volume of the casing 6 can be increased before the fuel gas concentration in the casing 6 actually rises due to leak of fuel gas. Therefore, even in the case where the leak flow rate of fuel gas temporarily increases due to a sudden change in the power generation conditions of the fuel cell power plant 1, gas containing fuel gas is efficiently discharged from the casing 6 by first increasing the ventilation air volume of the casing 6. Also, when the required power output is small and the leak flow rate of fuel gas is small, the rotation speed of the exhaust fan 7 is less, so the power consumed to drive the exhaust fan 7 can also be suppressed small.

As the exhaust gas flow rate of the exhaust fan 7 is controlled based on the required power output, the exhaust gas flow rate can be controlled without being affected by a bias in the distribution of the fuel gas concentration in the casing 6.

As mentioned above, in this embodiment, it is assumed that the fuel gas was completely consumed by power generation, but if any fuel gas is not used for power generation, it is processed by the anode effluent combustion device which is separately provided. However, the anode effluent produced by the anode 2a after the power generation reaction can also be discharged into the casing 6. In this case also, the fuel gas concentration in the casing 6 still increases according to the required power output, and therefore the rise of fuel gas concentration in the casing 6 can be efficiently suppressed by controlling the exhaust gas flow rate of the exhaust fan 7 according to the required power output.

Next, referring to FIGS. 7-11, a second embodiment of this invention will be described.

Figure 7:
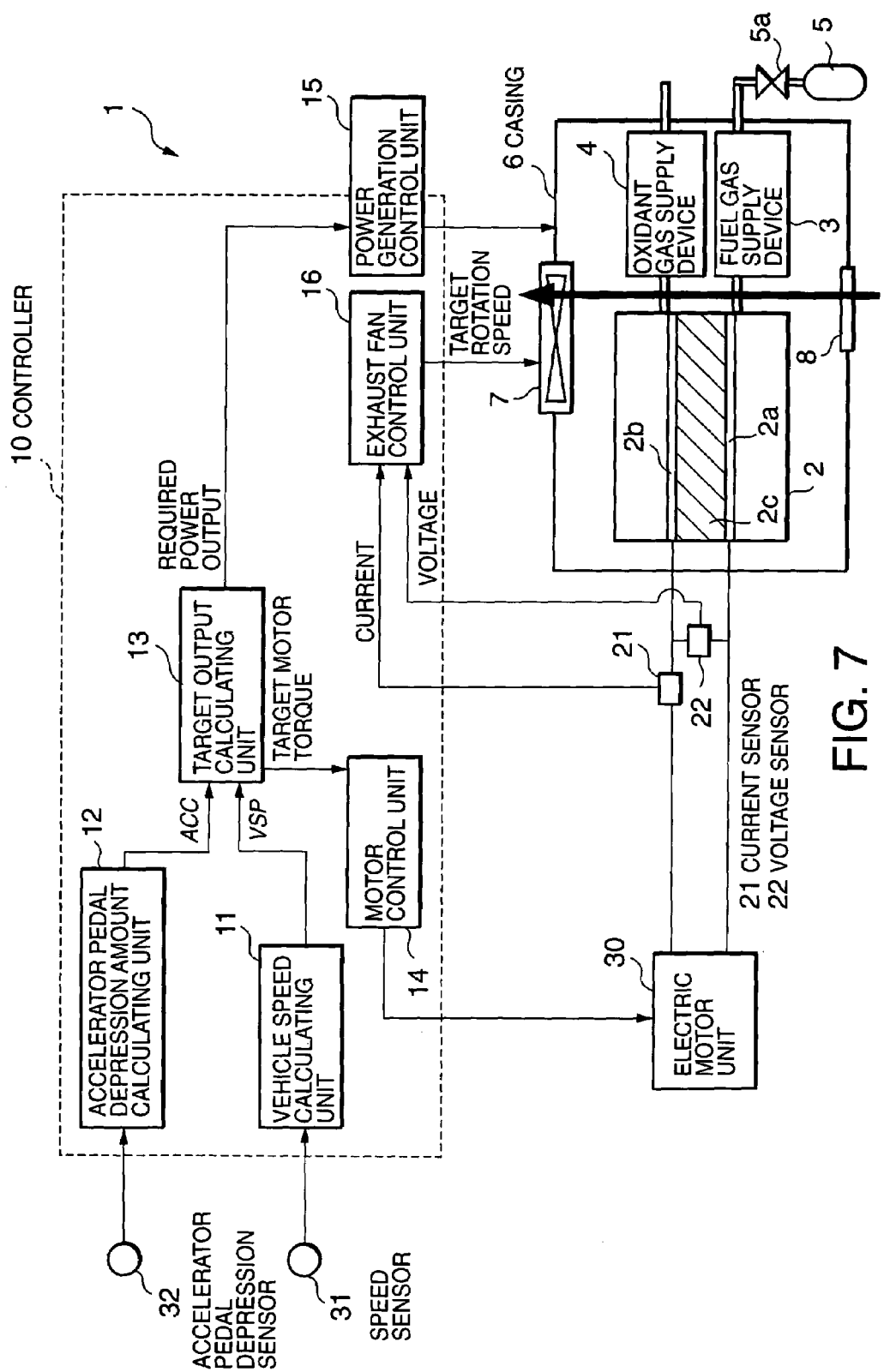
FIG. 7 is similar to FIG. 1, but shows a second embodiment of this invention.

Referring to FIG. 7, the fuel cell power plant 1 according to this embodiment is provided with an electric current sensor 21 which detects an output current of the fuel cell stack 2, and a voltage sensor 22 which detects an output voltage of the fuel cell stack 2. The construction of the remaining hardware is identical to that of the first embodiment.

This embodiment also differs from the first embodiment in the details of the control of the exhaust gas flow rate of the exhaust fan 7 by the controller 10, i.e., the construction of the exhaust fan control unit 16.

Figure 8:
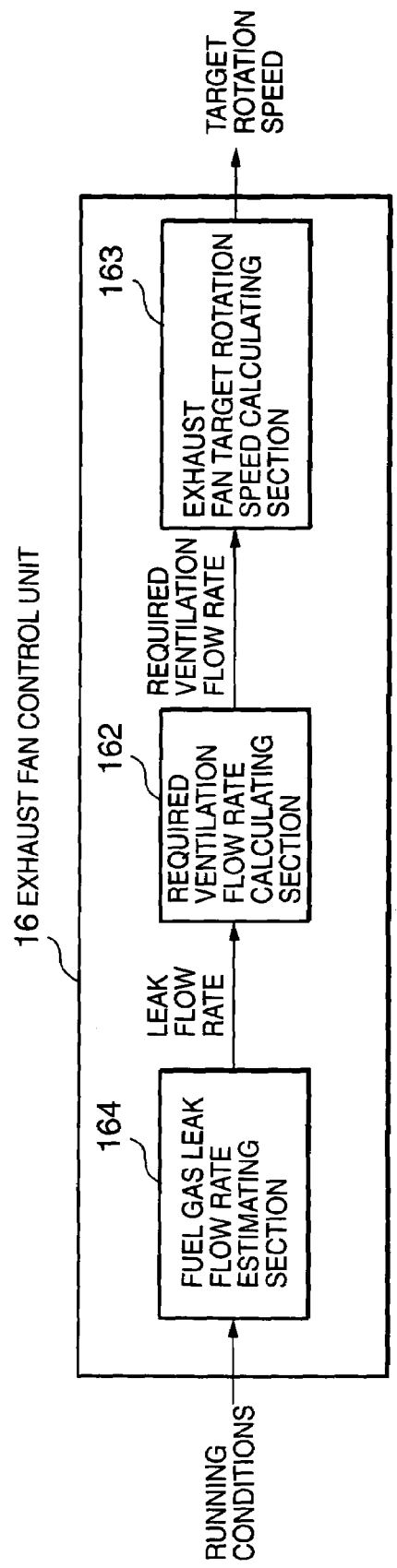
FIG. 8 is a block diagram describing a ventilation fan control function of a controller according to the second embodiment of this invention.

Referring to FIG. 8, the exhaust fan control unit 16 according to this embodiment comprises a fuel gas leak flow rate estimating section 164 instead of the fuel gas leak flow rate estimating section 161 of the first embodiment.

The fuel gas leak flow rate estimating section 164 is similar to the fuel gas leak flow rate estimating section 161 of the first embodiment, but the fuel gas leak flow rate is estimated by using various running conditions relevant to the load of the fuel cell stack 2 as parameters instead of the required power output.

Herein, the real output power of the fuel cell stack 2 is calculated by multiplying the output current of the fuel cell stack 2 detected by the current sensor 21, by the output voltage of the fuel cell stack 2 detected by the voltage sensor 22.

Figure 9:
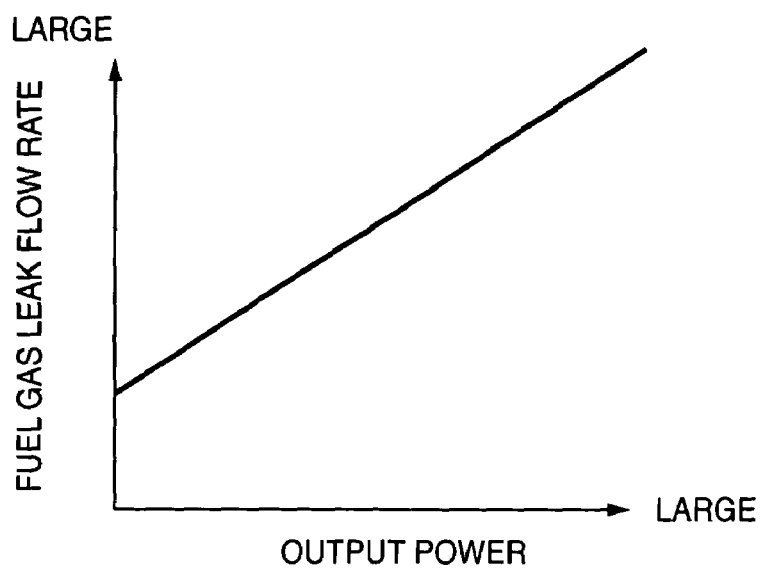
FIG. 9 is a diagram describing the characteristics of a map of fuel gas leak flow rate stored by the controller according to the second embodiment of this invention.

The fuel gas leak flow rate estimating section 164 estimates the fuel gas leak flow rate from this real output power by looking up a map having the characteristics shown in FIG. 9. This map is prestored in the memory (ROM) of the controller 10.

It is considered that, when the real output power of the fuel cell stack 2 is large, the supply flow rate of the fuel gas supplied to the fuel cell stack 2 is also large, and correspondingly, that the leak flow rate of fuel gas also increases. The characteristics of FIG. 9 are set based on such an assumption.

The remaining construction of the exhaust fan control unit 16 is identical to that of the first embodiment.

According to this embodiment, as in the first embodiment, the increase of fuel gas concentration in the casing 6 can be efficiently suppressed. Also in this embodiment, as in the first embodiment, the anode effluent produced by the anode 2a after the power generation reaction can be discharged into the casing 6.

In this embodiment, the current sensor 21 and voltage sensor 22 are provided to detect the output power of the fuel cell stack 2. However, it is also possible to omit the current sensor 21 or the voltage sensor 22. It can be considered that the output current of the fuel cell stack 2 and output voltage are respectively values representing the load of the fuel cell stack 2.

Figure 10:
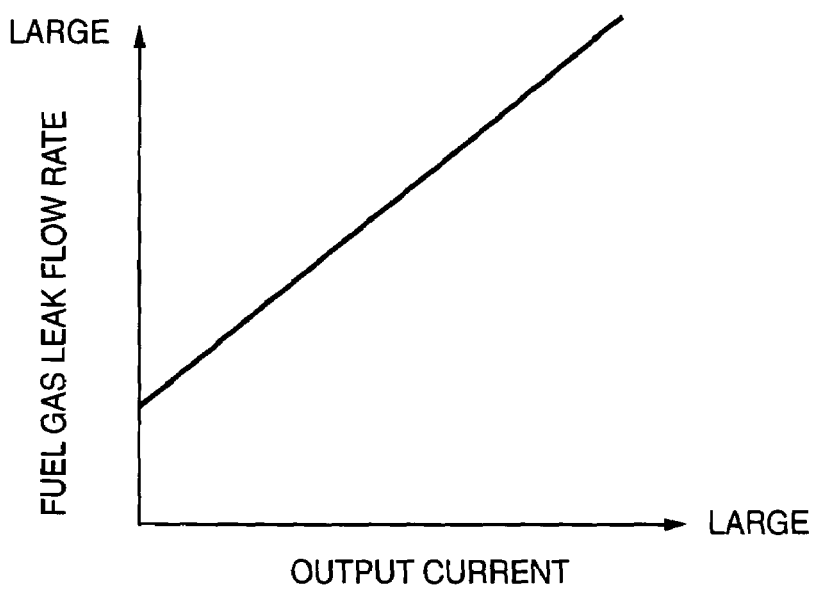
FIG. 10 is a diagram describing a variation concerning the map of fuel gas leak flow rate stored by the controller according to the second embodiment of this invention.

Hence, the voltage sensor 22 may be omitted and the fuel gas leak flow rate estimating section 164 may estimate the fuel gas leak flow rate by looking up a map having the characteristics shown in FIG. 10 from the output current of the fuel cell stack 2 detected by the current sensor 21. Alternatively, the current sensor 21 may be omitted and the fuel gas leak flow rate estimating section 164 may estimate the fuel gas leak flow rate by looking up a map having the characteristics shown in FIG. 11 from the output voltage of the fuel cell stack 2 detected by the voltage sensor 22.

Figure 11:
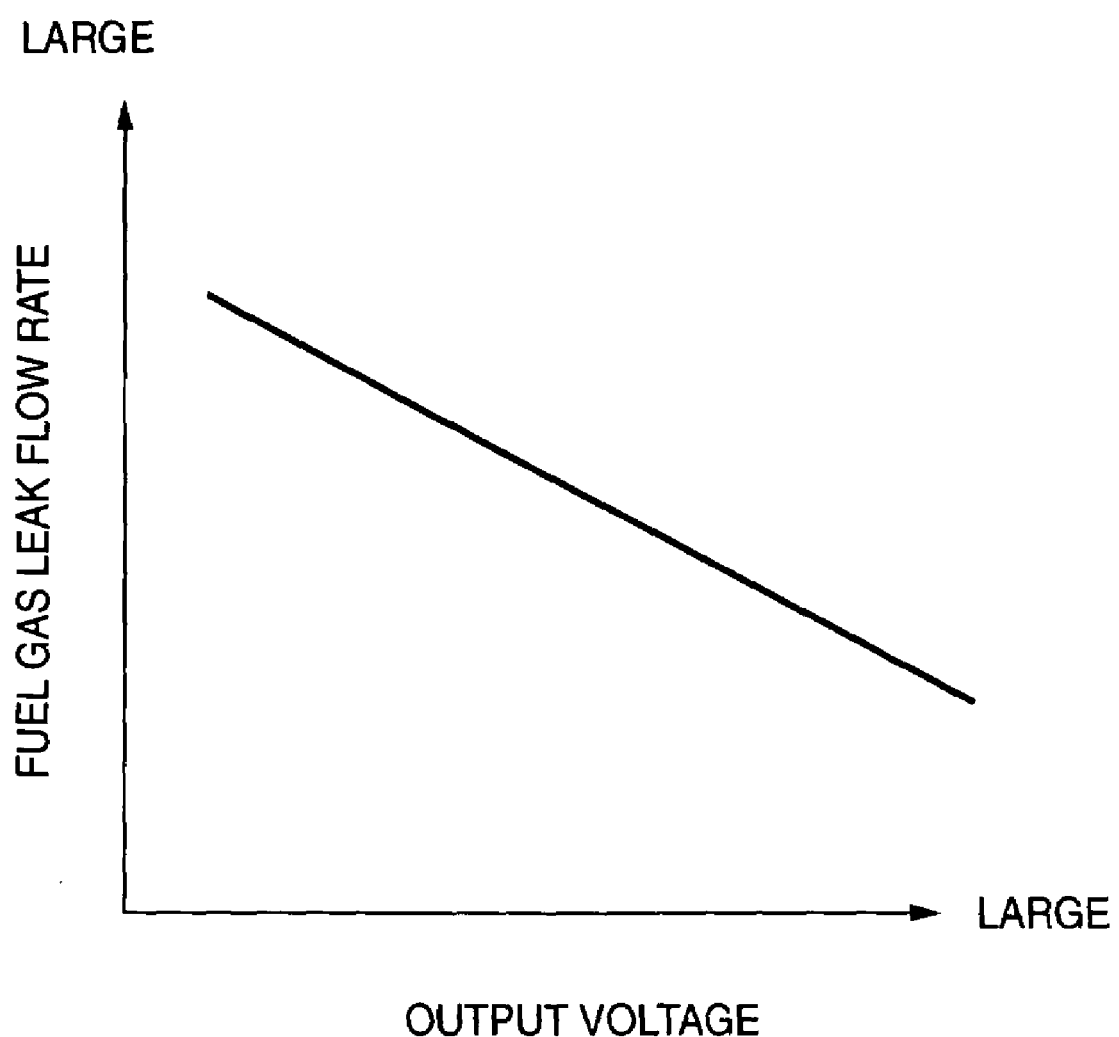
FIG. 11 is a diagram describing a further variation concerning a map of fuel gas leak flow rate stored by the controller according to the second embodiment of this invention.

Referring to FIG. 10, when the output current of the fuel cell stack 2 is large, it is considered that the supply flow rate of fuel gas supplied to the fuel cell stack 2 is also large, and correspondingly, that the leak flow rate of fuel gas increases. Referring to FIG. 11, herein, if the supply flow rate of fuel gas supplied to the fuel cell stack 2 increases, it is considered that the output voltage of the fuel cell stack 2 decreases relatively, and that the leak flow rate of fuel gas increases according to the decrease of output voltage of the fuel cell stack 2. These characteristics are based on the basic characteristic of a fuel cell that output voltage decreases with increase of power generation load.

Thus, the construction of the fuel cell power plant 1 for controlling the exhaust fan 7 can be simplified by omitting one of the sensors 21 and 22.

Figure 12:
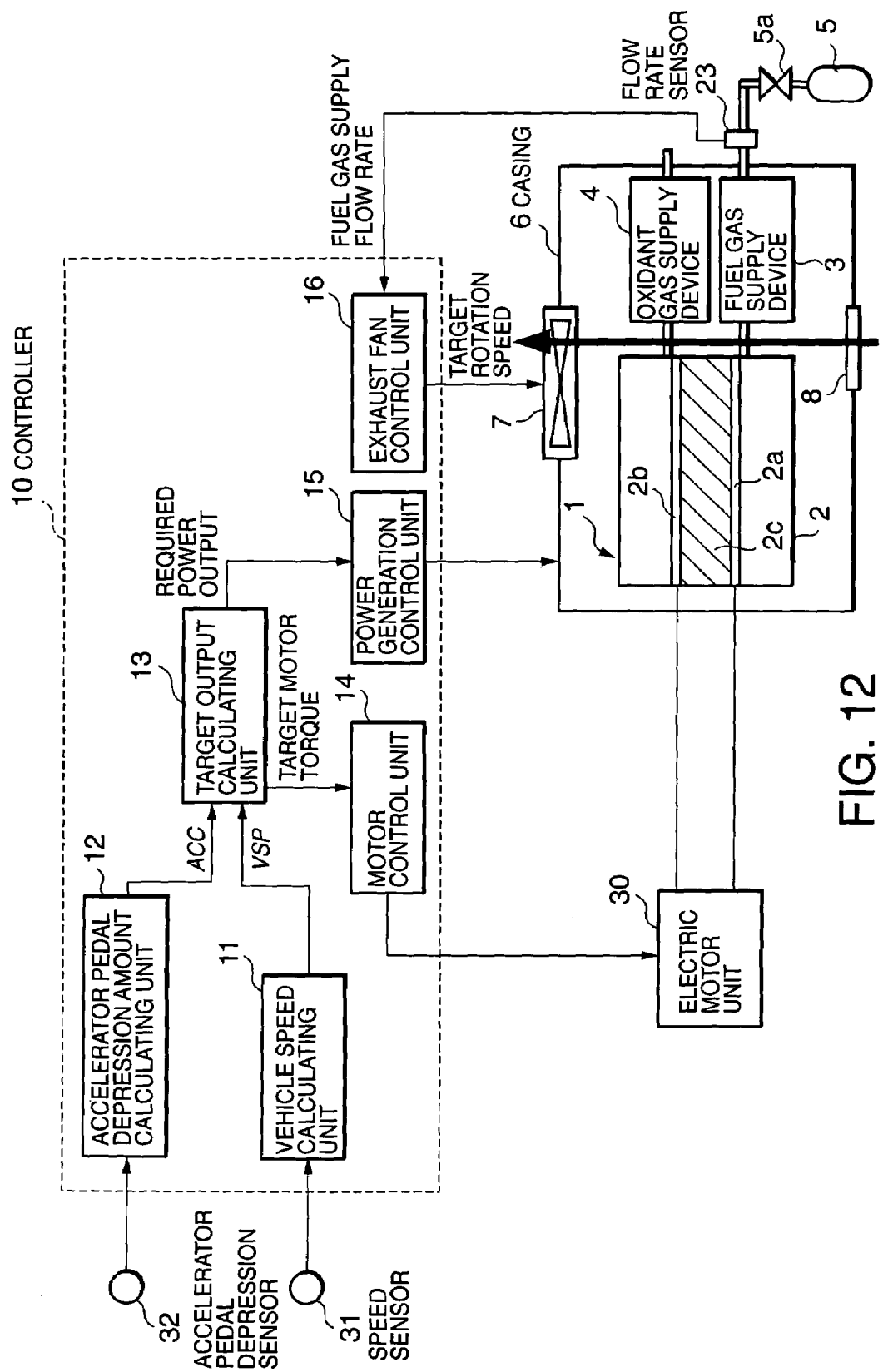
FIG. 12 is similar to FIG. 1, but shows a third embodiment of this invention.

Next, referring to FIG. 12, a third embodiment of this invention will be described.

The fuel cell power plant 1 according to this embodiment is provided with a flow rate sensor 23 which detects a mass flow rate of fuel gas supplied to the fuel gas supply device 3 from the fuel tank 5. The construction of the remaining hardware is identical to that of the first embodiment.

As the fuel gas flow rate supplied to the fuel gas supply device 3 from the fuel tank 5 increases according to the power generation load of the fuel cell stack 2, this can be used as a value representing the load of the fuel cell stack 2. Hence, the fuel gas leak flow rate estimating section 164 increases the estimate of fuel gas leak flow rate as the fuel gas supply flow rate detected by the flow rate sensor 23 increases. As a result, the rotation speed of the exhaust fan 7 increases as the fuel gas supply flow rate increases.

As the fuel gas leak flow rate is directly related to the fuel gas supply flow rate, according to this embodiment, the exhaust gas flow rate of the exhaust fan 7 can be precisely controlled. Also in this embodiment, as in the first embodiment, a construction is possible wherein the anode effluent produced by the anode 2a after the power generation reaction is discharged into the casing 6.

Figure 13:
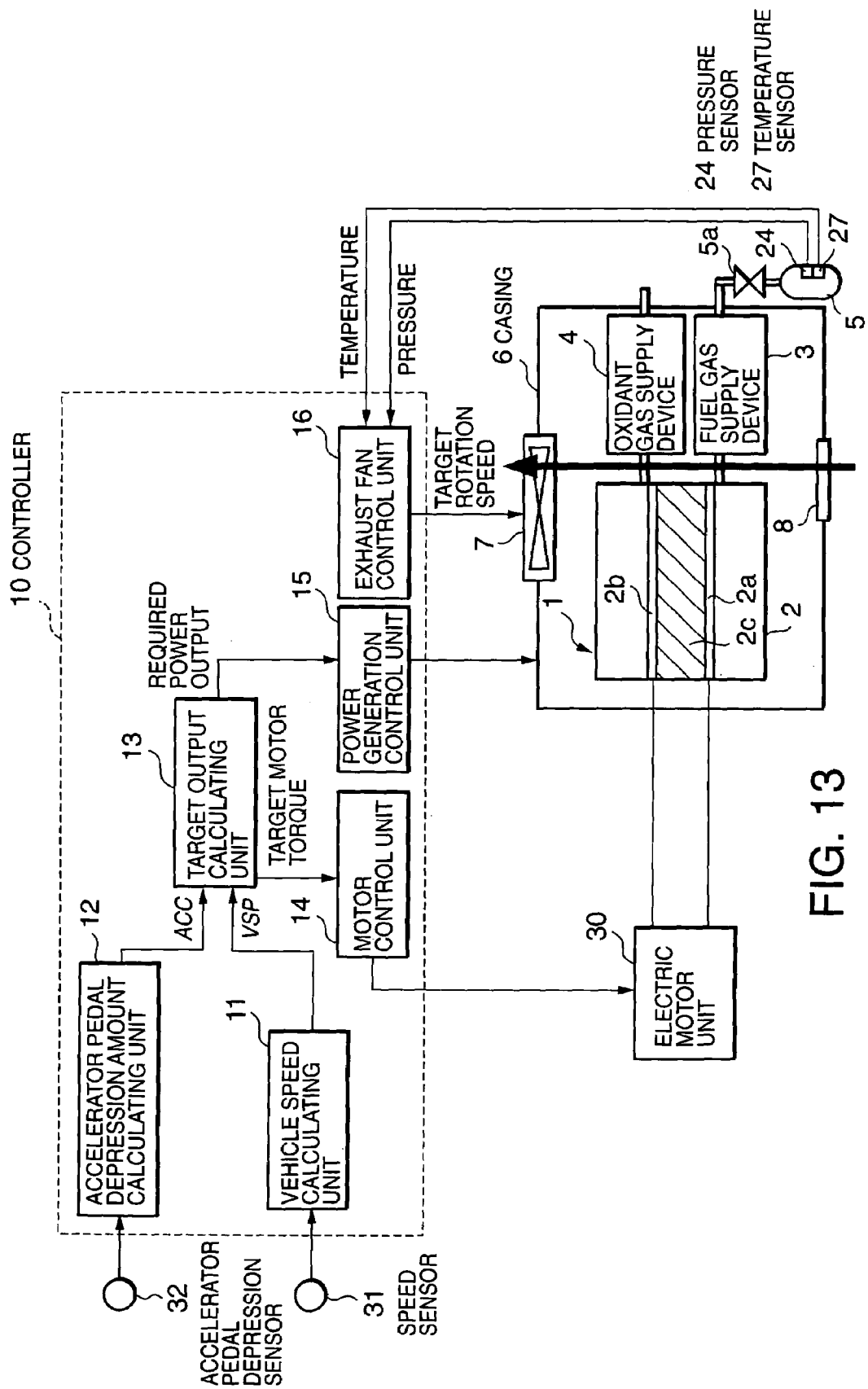
FIG. 13 is similar to FIG. 1, but shows a fourth embodiment of this invention.
Figure 14:
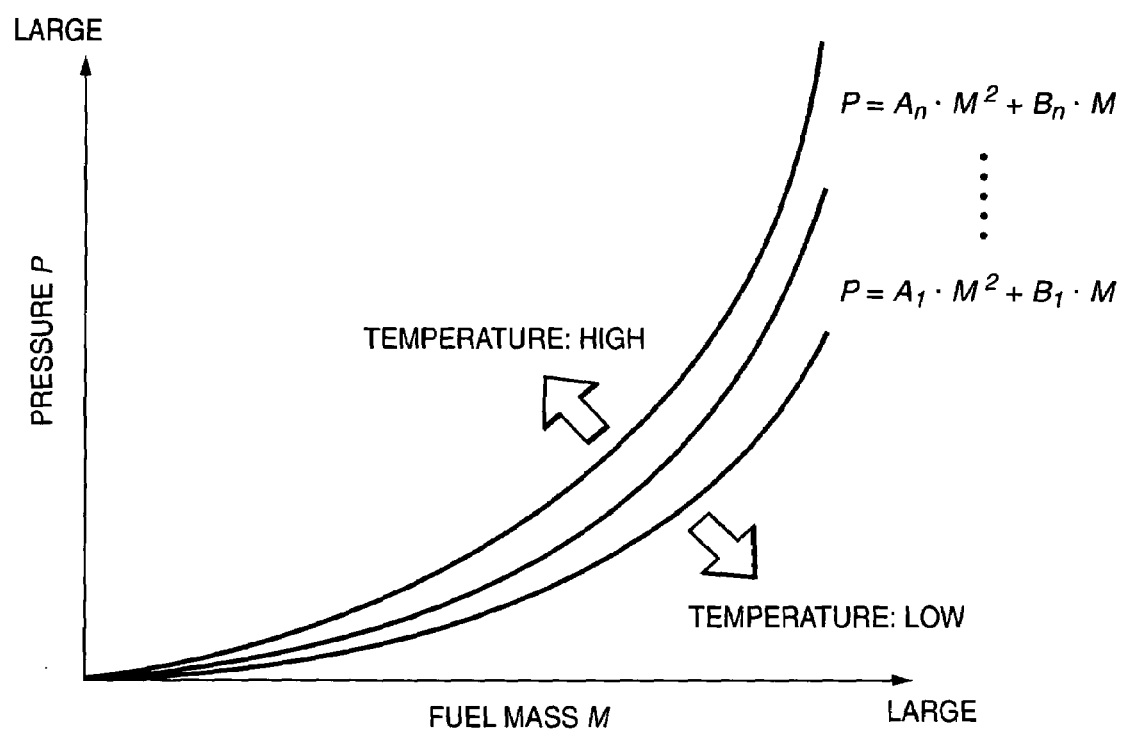
FIG. 14 is a diagram describing the characteristics of a map of fuel tank pressure stored by a controller according to the fourth embodiment of this invention.

Referring to FIGS. 13 and 14, a fourth embodiment of this invention will now be described.

Referring to FIG. 13, instead of the flow rate sensor 23 according to the third embodiment, the fuel cell power plant 1 according to this embodiment is provided with a pressure sensor 24 which detects a pressure of the fuel tank 5, and a temperature sensor 27 which detects a temperature in the fuel tank 5. The construction of the remaining hardware is identical to that of the third embodiment.

The relation between the hydrogen mass of the high pressure tank and the tank pressure is given by the following van der Waals equation:

$$P = \frac{n \cdot R \cdot T}{V - n \cdot b} - \frac{n^2 \cdot a}{V^2}$$

wherein, P=tank internal pressure,
n=number of moles of hydrogen in the tank,
R=gas constant,
V=tank volume, and
a, b=constants depending on the gas.

This formula can be approximated by a second-order equation. Hence, by first setting the second-order coefficients A and B of the second-order equation according to the temperature of the fuel tank 5 experimentally, a two-dimensional map of fuel mass flow rate having the pressure and temperature of the fuel tank 5 as parameters as shown in FIG. 14, can be prepared. This map is prestored in the memory (ROM) of the controller 10.

The fuel gas leak flow rate estimating section 164 calculates the mass flow rate of fuel gas supplied to the fuel gas supply device 3 from the fuel tank 5, from the pressure and temperature in the fuel tank 5, by looking up a map having the characteristics shown in FIG. 14. Specifically, the variation of the fuel gas mass in the tank 5, i.e., the mass flow rate of fuel gas, is calculated from the pressure change. The control of the exhaust gas flow rate of the exhaust fan 7 after calculating the mass flow rate of fuel gas, is identical to that of the third embodiment.

In this embodiment, although the temperature of the fuel tank 5 is detected using the temperature sensor 27, the temperature of the fuel tank during steady running can be considered as essentially constant, and the fuel mass flow rate estimated only from the pressure change of the fuel tank 5 based on a curve corresponding to a typical temperature in FIG. 14. In this case, the temperature sensor 27 can be omitted and the construction of the fuel cell power plant 1 for controlling the exhaust fan 7 can be simplified.

Also in this embodiment, a construction is possible wherein the anode effluent produced by the anode 2a after the power generation reaction is discharged into the casing 6, as in the first embodiment.

Figure 15:
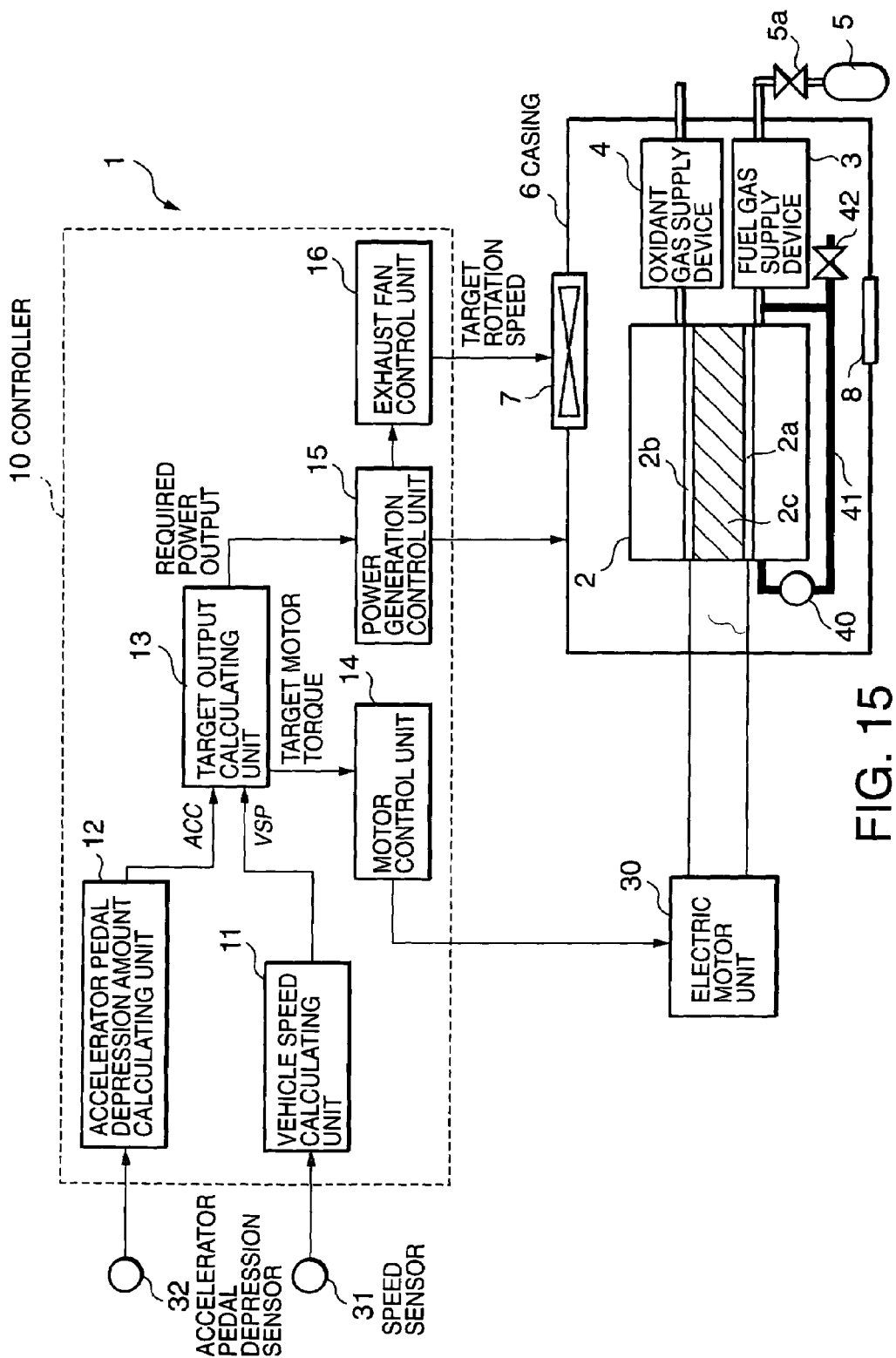
FIG. 15 is similar to FIG. 1, but showing a fifth embodiment of this invention.

Next, referring to FIG. 15, a fifth embodiment of this invention will be described.

The fuel cell power plant 1 according to this embodiment is provided with a recirculation passage 41 which re-supplies anode effluent to a fuel gas supply inlet of the fuel cell stack 2, a pump 40 which forcibly recycles anode effluent into the recirculation passage 41, and a purge valve 42 which discharges the anode effluent in the recirculation passage 41 into the space in the casing 6.

The construction of the remaining hardware of the fuel cell power plant 1 is identical to that of the first embodiment.

When the fuel cell stack 2 generates power, nitrogen permeates the anode 2a from the cathode 2b via the electrolyte 2c. When nitrogen enters the anode 2a, the power generating efficiency of the fuel cell stack 2 falls. Thus, the power generating efficiency is prevented from falling by occasionally purging anode effluent to the space in the casing 6.

In normal operation, the valve 42 is closed and anode effluent is re-supplied to the fuel gas supply inlet by operating the pump 40. If the nitrogen concentration of the anode 2a increases, the controller 10 opens the purge valve 42 and purges anode effluent to the space in the casing 6.

In addition to controlling the exhaust flow rate of the exhaust fan 7 as in the first embodiment, the controller 10 performs control of the purge valve 42 and pump 40. In control of the purge valve 42, the opening frequency of the purge valve 42 is increased, as the required power output of the fuel cell stack 2 increases. This is because the amount of nitrogen which permeates the anode 2a from the cathode 2b increases, as the required power output of the fuel cell stack 2 increases. Instead of changing the opening frequency of the purge valve 42, the ratio of the opening period and closing period of the purge valve 42 can also be controlled.

On the other hand, the fuel gas leak flow rate estimating section 161 estimates a purge flow rate based on the opening frequency or opening/closing period ratio of the purge valve 42. This relation is experimentally verified beforehand and stored in the memory (ROM) of the controller 10 as a map. This map has basic characteristics whereby the estimated purge flow rate is made to increase, as the opening frequency of the purge valve 42 or the opening period ratio of the purge valve 42 increases.

The fuel gas leak flow rate estimating section 161 further adds the estimated purge flow rate to the fuel gas leak flow rate described for the first embodiment, and thereby performs an increase correction of the fuel gas leak flow rate. The required ventilation flow rate calculating section 162 calculates the target exhaust gas flow rate based on the fuel gas leak flow rate after correction. The subsequent processing is identical to that of the first embodiment.

Preferably, even after the estimated purge flow rate becomes zero, the fuel gas leak flow rate estimating section 161 continues to perform the increase correction of the fuel gas leak flow rate for some time.

Regarding the opening/closing control of the purge valve 42, instead of varying the opening frequency or opening/closing period ratio, an opening degree of the purge valve 42 can also be varied at the same opening frequency. Specifically, the opening degree when the purge valve 42 is opened, is increased as the required power output of the fuel cell stack 2 increases.

If water clogging occurs in the anode 2a, anode effluent is purged from the purge valve 42 to eliminate the water clogging. Also in this case, the exhaust fan control unit 16 of the controller 10 likewise performs the increase correction of the fuel gas leak flow rate based on the opening/closing information of the purge valve 42.

In this embodiment, the case was described where purging of anode effluent was combined with the first embodiment, but control of ventilation relating to purging of anode effluent can be combined with any of the second to fourth embodiments.

Figure 16:
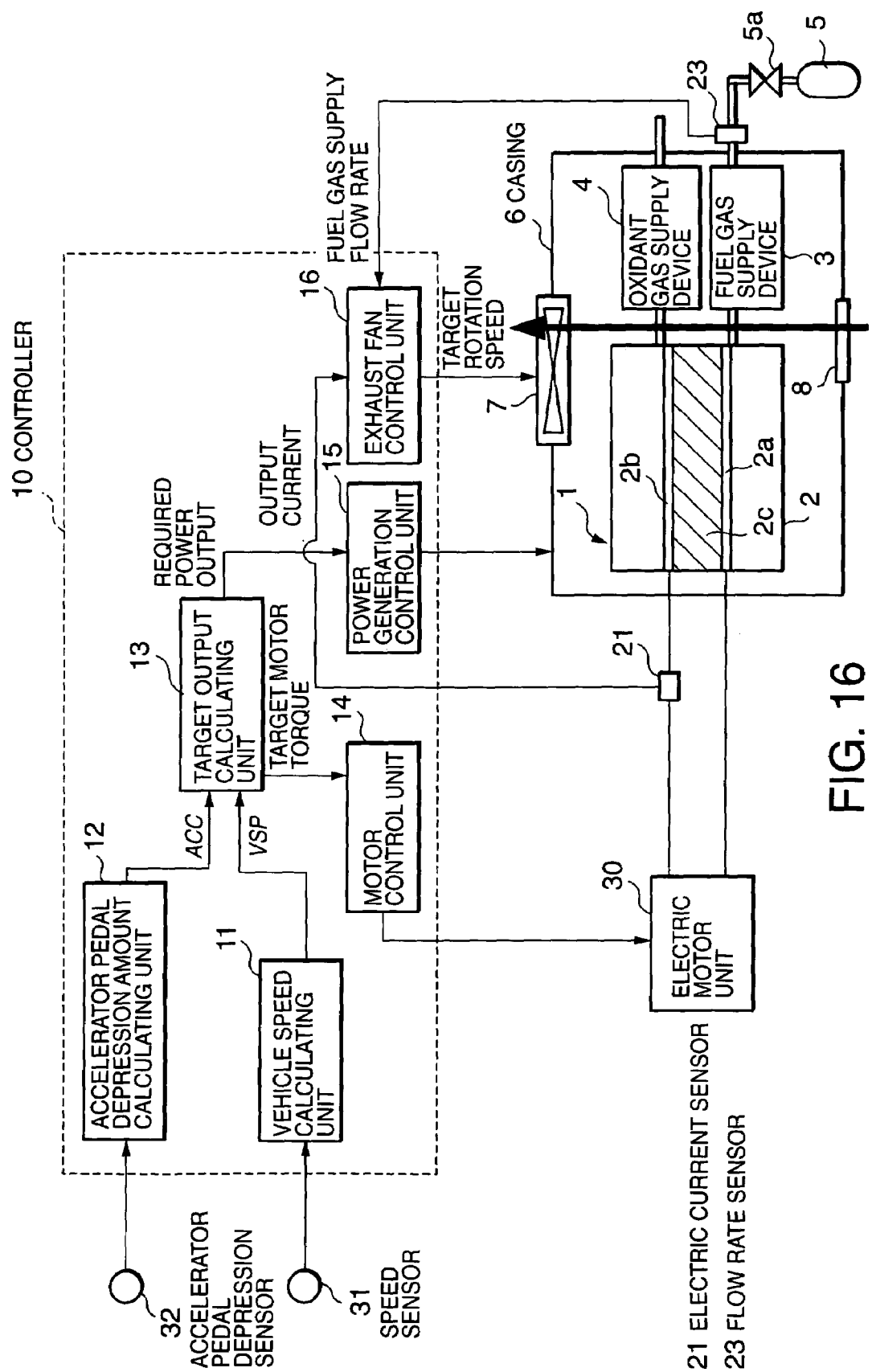
FIG. 16 is similar to FIG. 1, but showing a sixth embodiment of this invention.
Figure 17:
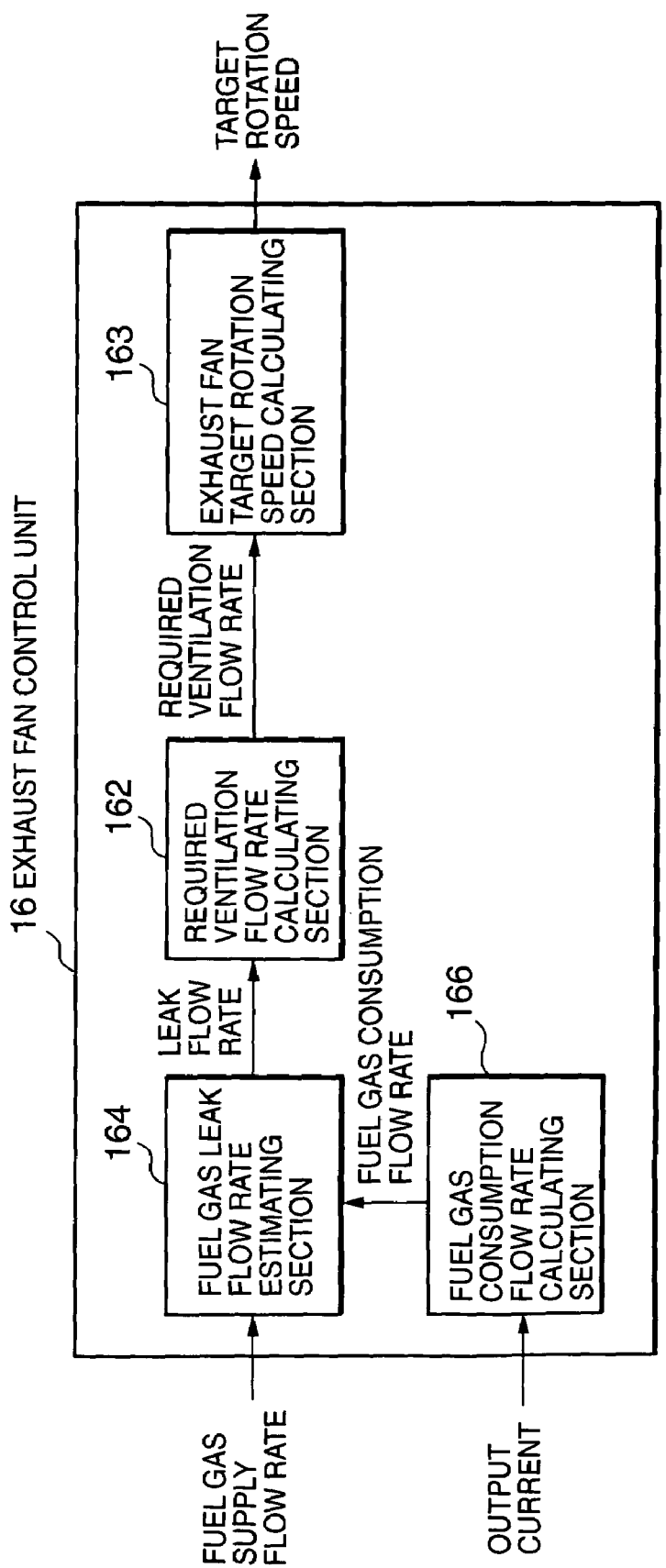
FIG. 17 is a block diagram describing a ventilation fan control function of a controller according to the sixth embodiment of this invention.

Next, referring to FIGS. 16 and 17, a sixth embodiment of this invention will be described.

The fuel cell power plant 1 according to this embodiment is provided with the same current sensor 21 as that of the second embodiment, and the same flow rate sensor 23 as that of the third embodiment. In addition to the construction described for the second embodiment, the exhaust fan control unit 16 of the controller 10 is further provided with a fuel gas consumption flow rate calculating section 166. The remaining construction is identical to that of the second embodiment in which the voltage sensor 22 is omitted.

The fuel gas consumption flow rate calculating section 166 calculates the consumption flow rate of fuel gas which the fuel cell stack 2 consumes based on the output current of the fuel cell stack 2 detected by the current sensor 21. Herein, the consumption flow rate of fuel gas also increases, as the output current of the fuel cell stack 2 increases.

The fuel gas leak flow rate estimating section 164 calculates an estimated value of the fuel gas leak flow rate by deducting the consumption flow rate of fuel gas calculated by the fuel gas consumption flow rate calculating section 166 from the fuel gas supply flow rate detected by the flow rate sensor 23.

The control of the exhaust fan 7 based on the fuel gas leak flow rate is identical to that of the second embodiment.

According to this embodiment, as the difference of fuel gas supply flow rate and consumption flow rate is taken as the leak flow rate, even when a crack arises for example in the fuel gas piping and a large leak occurs, the leak flow rate can be properly assessed and operation of the ventilation fan 7 can be made to correspond therewith.

Although the output current of the fuel cell stack 2 is used as a parameter for calculating the consumption flow rate of fuel gas in this embodiment, the consumption flow rate of fuel gas may also be calculated from the output power or output voltage of the fuel cell stack 2.

It is also preferred to combine this embodiment with the anode effluent purge device of the fifth embodiment. As the difference of supply flow rate and consumption flow rate of fuel gas, includes the purging flow rate of anode effluent, in a fuel cell power plant according to a combination of this embodiment and the fifth embodiment, the ventilation flow rate is controlled taking into account the purging of anode effluent without requiring any special calculation of the purging flow rate.

Further, although for example the purging flow rate of anode effluent will largely vary if the purge valve 42 is fixed at an open position, the fuel cell power plant will control the ventilation flow rate to match the actual purging flow rate, so the fuel gas concentration in the casing 6 can be definitively maintained below the allowable concentration in the casing 6.

Next, referring to FIGS. 18 and 19, a seventh embodiment of this invention will be described.

Figure 18:
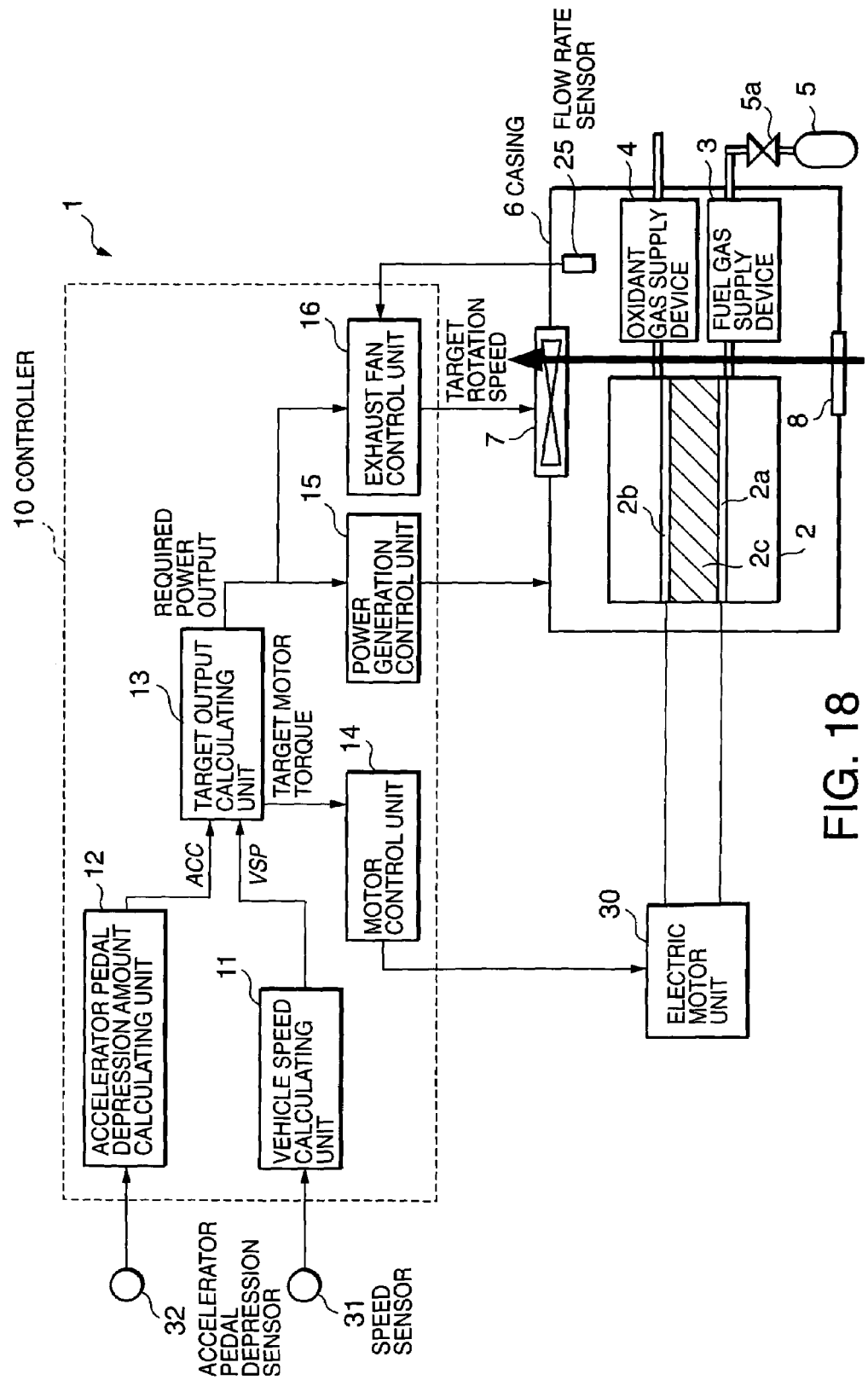
FIG. 18 is similar to FIG. 1, but shows a seventh embodiment of this invention.

Referring to FIG. 18, in addition to the construction of the first embodiment, the fuel cell power plant 1 of this embodiment is provided with a flow rate sensor 25 which detects the exhaust gas flow rate of the exhaust fan 7 in the casing 6.

Figure 19:
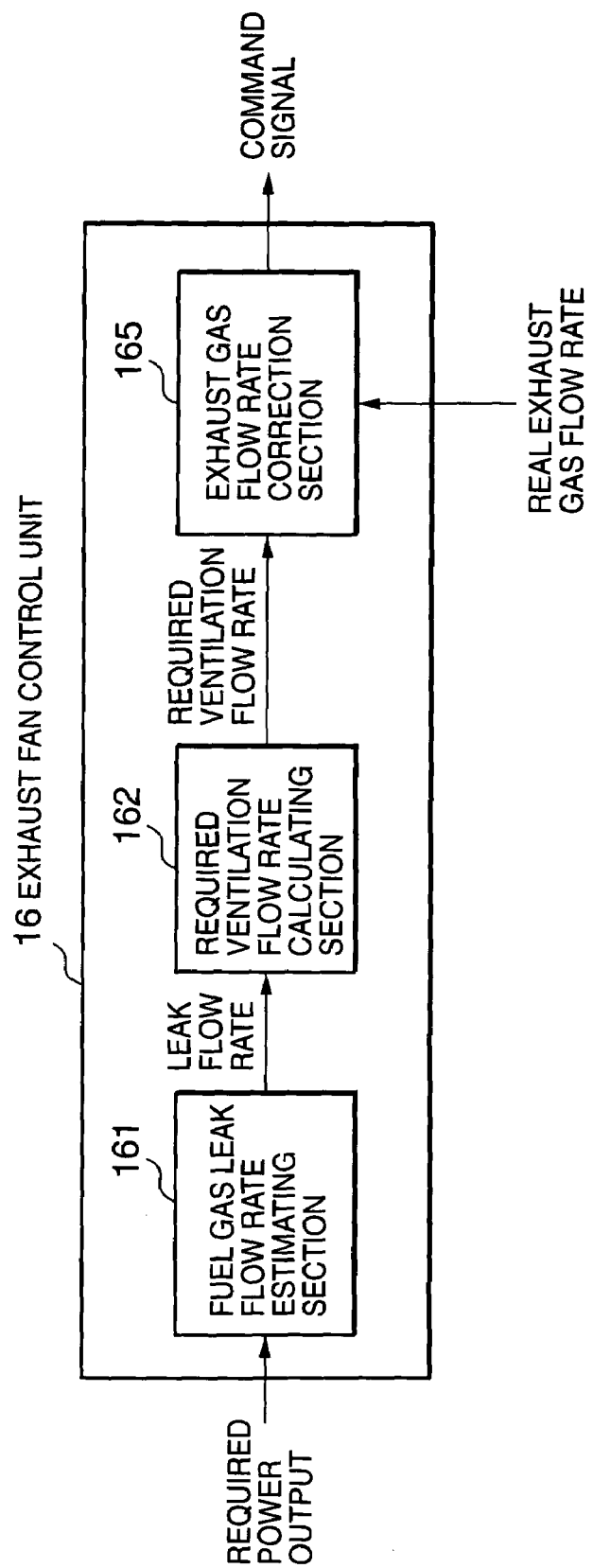
FIG. 19 is a block diagram describing a ventilation fan control function of a controller according to the seventh embodiment of this invention.

Referring to FIG. 19, the exhaust fan control unit 16 of the controller 10 is provided with an exhaust gas flow rate correction section 165 instead of the exhaust fan target rotation speed calculating section 163 of the first embodiment. The remaining construction is identical to that of the first embodiment.

The exhaust gas flow rate correction section 165 performs feedback control of the command signal outputted to the exhaust fan 7 based on the target exhaust gas flow rate of the exhaust fan 7 calculated by the required ventilation flow rate calculating section 162, and the real exhaust gas flow rate of the exhaust fan 7 detected by the flow rate sensor 25.

For example, the deviation of the target exhaust gas flow rate and the real exhaust gas flow rate is calculated, and the command signal is corrected so that the deviation is reduced. By repeating this processing, the real exhaust gas flow rate of the exhaust fan 7 is definitively controlled to the target exhaust gas flow rate.

In the fuel cell power plant 1 mounted on a vehicle, the exhaust performance of the exhaust fan 7 may be affected by running wind. In such a case also, the exhaust gas flow rate of the exhaust fan 7 can be precisely controlled to the target exhaust gas flow rate by performing the above feedback correction of the command signal outputted to the exhaust fan 7.

According to this embodiment, although the exhaust gas flow rate of the exhaust fan 7 is detected, it is also possible to provide the flow rate sensor 25 in the fresh air inlet 8.

The feedback control of the exhaust gas flow rate described in this embodiment does not depend on the method of calculating the target exhaust gas flow rate. Therefore, the feedback control of the exhaust gas flow rate in this embodiment can be combined with any of the second to sixth embodiments.

The contents of Tokugan 2003-42692, with a filing date of Feb. 20, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A fuel cell power plant comprising:
   a fuel cell stack comprising a laminate of fuel cells each of which comprises an anode a cathode and an electrolyte to generate power by an electrochemical reaction between a fuel gas supplied to the anode and an oxidant gas supplied to the cathode, via the electrolyte;
   a fuel gas supply device which supplies fuel gas to the anode;

an oxidant gas supply device which supplies oxidant gas to the cathode;

a casing which, among the fuel cell stack, the fuel gas supply device and the oxidant gas supply system, houses at least the fuel cell stack;

a ventilator which ventilates the inside of the casing; and a controller programmed to control operation of the ventilator according to a power generation load of the fuel cell stack.

2. The fuel cell power plant as defined in claim 1, wherein the controller is further programmed to control operation of the ventilator using a required power output of the fuel cell stack as the load of the fuel cell stack.

3. The fuel cell power plant as defined in claim 1, wherein the power plant is a power plant for driving a vehicle, the vehicle comprises an accelerator pedal, the power plant further comprises an accelerator pedal depression sensor which detects a depression amount of the accelerator pedal and a vehicle speed sensor which detects a vehicle running speed, and the controller is further programmed to calculate the required power output of the fuel cell stack based on the accelerator pedal depression amount and the vehicle running speed.

4. The fuel cell power plant as defined in claim 1, wherein the power plant further comprises a sensor which detects a running parameter of the power plant corresponding to the power generation load of the fuel cell stack, and the controller 10 is further programmed to control the operation of the ventilator using the running parameter as the load of the fuel cell stack.

5. The fuel cell power plant as defined in claim 4, wherein the running parameter detecting sensor comprises at least one of a sensor which detects an output current of the fuel cell stack, and a sensor which detects an output voltage of the fuel cell stack, and the controller is further programmed to control the operation of the ventilator based on at least one of the output current of the fuel cell stack and the output voltage of the fuel cell stack.

6. The fuel cell power plant as defined in claim 4, wherein the running parameter detecting sensor comprises a sensor which detects a fuel gas supply flow rate of fuel gas from the fuel gas supply device to the anode, and the controller is further programmed to control operation of the ventilator based on the fuel gas supply flow rate.

7. The fuel cell power plant as defined in claim 6, wherein the fuel gas supply device comprises a tank which stores fuel, the running parameter detecting sensor comprises a sensor which detects a pressure in the tank, and the controller is further programmed to calculate a pressure variation rate in the tank, and calculate the fuel gas supply flow rate based on the pressure variation rate.

8. The fuel cell power plant as defined in claim 4, wherein the running parameter detecting sensor comprises a sensor which detects an output current of the fuel cell stack, the power plant further comprises a sensor which detects a fuel gas supply flow rate to the anode, and the controller is further programmed to calculate a fuel gas consumption flow rate estimation value consumed by the fuel cell stack from the output current of the fuel cell stack, and control the operation of the ventilator based on a difference of the fuel gas consumption flow rate estimation value and the fuel gas supply flow rate.

9. The fuel cell power plant as defined in claims 1, wherein the power plant further comprises a purging device which purges gas which has accumulated in the anode to a space inside the casing outside the fuel cell stack, and the controller is further programmed to perform a correction of control of the operation of the ventilator according to an operating state of the purging device.

10. The fuel cell power plant as defined in claims 1, wherein the power plant further comprises a sensor which detects a real ventilation flow rate of the casing, and the controller is further programmed to set a target ventilation flow rate of the ventilator according to the power generation load of the fuel cell stack, and perform feedback control of the ventilator to cause the real ventilation flow rate to approach the target ventilation flow rate.

* * * * *